UNITED STATES PATENT OFFICE.

RICHARD WILLSTÄTTER AND WALTHER DUISBERG, OF MUNICH, AND TÜRGEN CALLSEN, OF ELBERFELD, GERMANY, ASSIGNORS TO FARBENFABRIKEN VORM. FRIEDR. BAYER AND CO., OF LEVERKUSEN, NEAR COLOGNE-ON-THE-RHINE, GERMANY.

URETHANE OF THE TRICHLOROETHYLIC ALCOHOL.

1,427,506.  Specification of Letters Patent.  Patented Aug. 29, 1922.

No Drawing.  Application filed August 11, 1921. Serial No. 491,514.

*To all whom it may concern:*

Be it known that we, RICHARD WILLSTÄTTER, WALTHER DUISBERG, and TÜRGEN CALLSEN, citizens of Germany, residing at, respectively, Munich, Munich, and Elberfeld, Germany, have invented new and useful Improvement in Urethane of the Trichloroethylic Alcohol, of which the following is a specification.

Our invention relates to a new and valuable product which is chemically the urethane of the trichloroethylic alcohol having the formula:

$$CCl_3-CH_2O.CO.NH_2.$$

According to our researches, it possesses valuable therapeutic, especially soporific properties; an average single dose being between  gram.

The process for producing this compound consists in converting by the methods known in chemistry the trichloroethylic alcohol into its urethane.

In order to carry out our new process practically, we can, for instance, proceed as follows: To a solution of 149.5 parts by weight of trichloroethylic alcohol in ether (free from water) an ethereal solution (free from water) of 79.5 parts by weight of carbamic chlorid $NH_2-COCl$ is added. The mixture is allowed to stand during about 24 hours, it is filtered and the ether is distilled off. The resulting residue, being the urethane of trichloroethylic alcohol, is crystallized from ligroin. Our new product is thus obtained in the shape of white needles melting at from 64-65° C. It is easily soluble in alcohol and ether and soluble with difficulty in cold water.

Having now described our invention and in what manner the same is to be performed, what we claim as new, and desire to secure by Letters Patent, is:—

As a new article of manufacture the urethane of trichloroethylic alcohol, having most probably the formula:

$$CCl_3-CH_2O-CO.NH_2$$

forming when crystallized from ligroin white needles melting at from 64-65° C., being easily soluble in alcohol and ether; soluble with difficulty in cold water; and adapted for being used in medicine as soporific.

In testimony whereof we have hereunto set our hands in the presence of two subscribing witnesses.

RICHARD WILLSTÄTTER.
WALTHER DUISBERG.
TÜRGEN CALLSEN.

Witnesses:
PAUL DREY,
RICHARD LÜTZ,
HANS BRÜCKNER,
EDWARD PARMENSKY.